(12) United States Patent
Zhou et al.

(10) Patent No.: US 11,829,875 B2
(45) Date of Patent: Nov. 28, 2023

(54) INFORMATION PROCESSING DEVICE, INFORMATION PROCESSING METHOD AND COMPUTER READABLE STORAGE MEDIUM

(71) Applicant: Sony Group Corporation, Tokyo (JP)

(72) Inventors: Shuangfei Zhou, Tokyo (JP); Fei Cao, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 188 days.

(21) Appl. No.: 17/349,932

(22) Filed: Jun. 17, 2021

(65) Prior Publication Data

US 2021/0397637 A1 Dec. 23, 2021

(30) Foreign Application Priority Data

Jun. 23, 2020 (CN) .......................... 202010579249

(51) Int. Cl.
| | | |
|---|---|---|
| *G06F 16/35* | (2019.01) | |
| *G06F 16/31* | (2019.01) | |
| *G06F 18/214* | (2023.01) | |
| *G06F 18/25* | (2023.01) | |
| *G06V 30/19* | (2022.01) | |
| *G06N 3/08* | (2023.01) | |

(52) U.S. Cl.
CPC ............. *G06N 3/08* (2013.01); *G06F 16/313* (2019.01); *G06F 16/35* (2019.01); *G06F 18/214* (2023.01); *G06F 18/253* (2023.01); *G06V 30/19127* (2022.01); *G06V 30/19147* (2022.01); *G06V 30/19173* (2022.01)

(58) Field of Classification Search
CPC ....... G06F 16/313; G06F 16/35; G06F 18/253
See application file for complete search history.

(56) References Cited

U.S. PATENT DOCUMENTS

| | | | |
|---|---|---|---|
| 11,521,106 B2* | 12/2022 | Nock | G06N 3/08 |
| 2007/0198506 A1* | 8/2007 | Attaran Rezaei | G06F 16/367 |
| | | | 707/999.005 |
| 2019/0164078 A1* | 5/2019 | Andrade Silva | G06F 16/00 |
| 2020/0356851 A1* | 11/2020 | Li | G06F 16/35 |
| 2021/0319179 A1* | 10/2021 | Muffat | G06F 16/355 |

* cited by examiner

*Primary Examiner* — Dangelino N Gortayo
(74) *Attorney, Agent, or Firm* — XSENSUS LLP

(57) ABSTRACT

An information processing device, an information processing method, a computer readable storage medium are provided. The information processing device comprises processing circuitry configured to: construct, for each of a plurality of indexes, a sample unit set for the index based on a plurality of minimum labeled sample units related to the index which are obtained and labeled from an original sample set; and extract, for at least a part of the constructed plurality of sample unit sets, a minimum labeled sample unit from each sample unit set, and generate a labeled training sample based on the extracted minimum labeled sample unit. A sample unit set is constructed based on minimum labeled sample units that are labeled manually, and a labeled training sample is generated automatically based on such sample unit sets, thereby generating the labeled training sample automatically to a certain degree, and reducing manual participation.

9 Claims, 6 Drawing Sheets

|  | False negative | False positive | True positive | False sentiment | Precision | Recall |
|---|---|---|---|---|---|---|
| Comparison example 1 | 832 | 795 | 2008 | 307 | 71.6% | 70.7% |
| Example 1 | 551 | 654 | 2289 | 213 | 77.8% | 80.6% |
| Example 2 | 352 | 387 | 2488 | 132 | 86.5% | 87.6% |

INFORMATION PROCESSING DEVICE, INFORMATION PROCESSING METHOD AND COMPUTER READABLE STORAGE MEDIUM

CROSS-REFERENCE TO RELATED APPLICATION

This application claims priority from CN 202010579249.8, filed on Jun. 23, 2020, the contents of which are incorporated by reference herein in its entirety.

FIELD

The present disclosure relates to field of data processing and/or data analysis, in particular to an information processing device, an information processing method, a computer readable storage medium and an information processing device storing an identification and classification model for texts of a specific field.

BACKGROUND

With the development of the deep learning technology, more and more deep learning models and methods are used to perform tasks in different fields in recent years. Strong capability of feature learning and representation of the deep learning model is obtained or learned by training by using a large number of labeled samples.

In fields such as natural language processing (NLP), the deep learning model is required to be trained by using an excessive number of training samples (such as hundreds of thousands to millions) sometime, so as to achieve model performance required by an actual application. Obtaining such a great level of training samples completely by manual labeling requires high time cost and economic cost. For many specific tasks in the vertical field, the input is far greater than the output, resulting in great difficulty for the actual application. Therefore, a method for obtaining labeled samples more efficiently than manual labeling is to be provided.

In another aspect, in the natural language processing, the existing deep learning models cannot meet the application requirements in many vertical fields. The pre-trained model, as an important development trend of the natural language processing, is concerned in the specific applications in the vertical filed presently. Taking the classification task as an example, a pre-trained classification model may be obtained by training by using general, universal texts, and the model is then finely adjusted by using the text data in the specific vertical field, to obtain a final classification model for the vertical field. However, due to a difference between the general, universal text used during the pre-training and subsequent real text data in the vertical field, classification performance of the final classification model is still not ideal. Therefore, for the specific task in the vertical field, it is expected to provide a classification model with higher precision.

SUMMARY

A brief summary of embodiments of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

In view of the above problem, an object of at least one aspect of the present disclosure is to provide an information processing device, an information processing method and a computer readable storage medium, with which a sample unit set is constructed based on minimum labeled sample units that are labeled manually, and a labeled training sample is generated automatically based on such sample unit sets, thereby generating the labeled training sample automatically to a certain degree.

In addition, an object of another aspect of the present disclosure is to provide an information processing device storing an identification and classification model for texts of a specific field. In the identification and classification model, a word embedding extraction model that is pre-trained by using texts not exclusively belonging to the specific field (such as general, universal texts) is used in combination with a contextual representation model that is not pre-trained, thereby obtaining advantages of the two models and thus improving final performance of identification and classification of the identification and classification model.

According to an aspect of the present disclosure, an information processing device is provided. The information processing device includes processing circuitry configured to: construct, for each of multiple indexes, a sample unit set for the index according to multiple minimum labeled sample units related to the index which are obtained and labeled from an original sample set; and extract, for at least a part of the constructed multiple sample unit sets, a minimum labeled sample unit from each sample unit set, and generate a labeled training sample based on the extracted minimum labeled sample unit.

According to another aspect of the present disclosure, an information processing device is provided. The information processing device includes a memory storing an identification and classification model for texts of a specific field. The identification and classification is to identify a part related to at least one index from inputted texts of the specific field, and perform classification on the identified part with respect to the related index. The identification and classification model includes: a word embedding extraction model that is obtained by pre-training by using at least a first text sample set not exclusively belonging to the specific filed, and configured to extract a word embedding from inputted texts; and a contextual representation model that is obtained by training by using a second sample set of the specific field, and configured to output a result of the classification according to the word embedding extracted by the word embedding extraction model.

According to another aspect of the present disclosure, an information processing method is provided. The method includes: constructing, for each of multiple indexes, a sample unit set for the index according to multiple minimum labeled sample units related to the index which are obtained and labeled from an original sample set; and extracting, for at least a part of the constructed multiple sample unit sets, a minimum labeled sample unit from each sample unit set, and generating a labeled training sample based on the extracted minimum labeled sample unit.

According to another aspect of the present disclosure, a non-transitory computer readable storage medium storing executable instructions is further provided. The executable instructions, when being executed by a processor, cause the processor to realize functions of the information processing device or the information processing method described above.

According to other aspects of the present disclosure, a computer program code and a computer program product for implementing the method of the present disclosure are further provided.

According to at least one aspect of embodiments of the present disclosure, the sample unit set are constructed based on the minimum labeled sample units which are labeled manually, and the labeled training samples are generated automatically based on the sample unit sets, thereby generating the labeled training samples automatically to a certain degree, reducing manual participation, and thus reducing the time cost and the economic cost for obtaining the labeled training samples.

According to at least another aspect of embodiments of the present disclosure, in the identification and classification model, the word embedding extraction model that is pre-trained based on the text not exclusively belonging to the specific field is combined with the contextual representation model that is not pre-trained, and hence the identification and classification model obtains good feature representation capability for the word embedding from the word embedding extraction model, and good contextual representation capability in the specific field from the contextual representation model, thereby improving a final identification and classification performance of the identification and classification model.

Other aspects of the embodiments of the present disclosure are described below. Detailed illustration is provided for sufficiently disclosing preferred embodiments of the present disclosure, and is not intended to limit the present disclosure.

BRIEF DESCRIPTION OF THE DRAWINGS

The drawings described here are used to schematically show the selected embodiments rather than all possible embodiments, and are not intended to limit the scope of the present disclosure. In the drawings.

Figure 1:
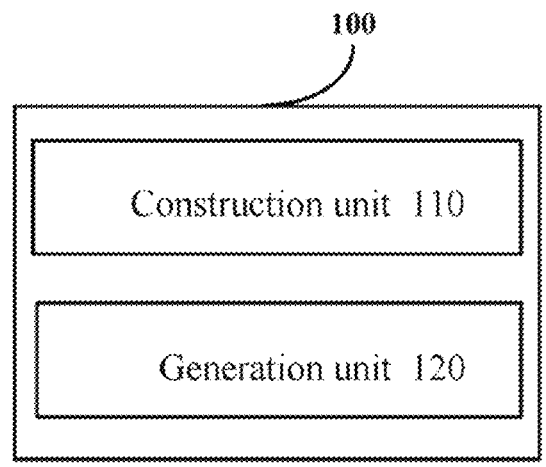
FIG. 1 shows a block diagram of a configuration example of an information processing device according to a first embodiment of the present disclosure.

Although the present disclosure is easily subjected to various modifications and replacements, specific embodiments as examples are shown in the drawings and described in detail here. However, it should be understood that, the description of specific embodiments is not intended to limit the present disclosure. In contrast, the present disclosure is intended to cover all modifications, equivalents and replacements falling within the spirit and scope of the present disclosure. It should be noted that, corresponding reference numerals indicate corresponding components throughout several drawings.

DETAILED DESCRIPTION OF EMBODIMENTS

Examples of the present disclosure are fully disclosed with reference to the drawings. The description below is only schematic in essence, and is not intended to limit the present disclosure, application or usage.

Exemplary embodiments are provided, so that the present disclosure will become thorough and fully convey the scope thereof to those skilled in the art. Many specific details such as examples of specific components, devices and methods are clarified here, to provide detailed understanding of embodiments of the present disclosure. It is apparent for those skilled in the art that, the exemplary embodiments may be implemented by many different ways without using the specific details, which should not be understood as limiting the scope of the present disclosure. In some exemplary embodiments, well-known processes, structures and technologies are not described in detail.

Description is to be made in the following order:
1. Overview
2. Configuration examples of an information processing device according to a first embodiment
   2.1 Configuration example of the information processing device
      2.1.1 Preprocessing for obtaining a minimum labeled sample unit
      2.1.2 Processing related to a construction unit
      2.1.3 Processing related to a generation unit (a first configuration example)
   2.2 Preferred configuration examples of the generation unit
      2.2.2 Second configuration example of the generation unit
      2.2.3 Third configuration example of the generation unit
      2.2.4 Fourth configuration example of the generation unit
3. Information processing method according to the first embodiment 4. Configuration examples of an information processing device according to a second embodiment
   4.1 Configuration example of the information processing device
   4.2 Sample sets for training models in the information processing device
   4.3 Application examples of the information processing device
5. Schematic structure of a general purpose personal computer for implementing the method and/or device according to the embodiments.

1. Overview

In field such as natural language processing (NLP), a deep learning model is trained by using hundreds of thousands of or even several millions of training samples sometimes, so as to achieve model performances meeting requirements of the actual application. For example, the deep learning model related to multiple labels and multiple tasks needs to perform multiple tasks that are related to multiple indexes (such as multiple classification tasks), and each sample for training such a model may have more than one label (that is, labels respectively related to some or all of the multiple tasks). Parameters of the complex deep learning model may be of a number of millions, and thus the number of the training samples for training the model should be of a corresponding level, thereby avoiding a problem of over-fitting.

The deep learning model related to multiple labels and multiple tasks may be applied widely, for example, in analyzing user comments on products on a commodity page (a product webpage) with respect to different aspects (different indexes or different tasks); in analyzing and determining intension or sentiment (for example positive, negative or neutral) from the user comments; in analyzing comments on books and video on social media and determining the related sentiment; and analyzing user feedback received by manual customer service and determining the related sentiment. The above applications each belong to specific tasks in the vertical field. In a case that the training samples of a great number meeting the model performance requirement are completely obtained by manual labeling, the time cost and the economic cost are high, and the input is greater than the output, resulting in great difficulty for the actual application.

In view of above, a concept of a minimum labeled sample unit (a minimum labeled unit or element of a sample) is put forward according to an aspect of the present disclosure. Accordingly, an information processing device, an information processing method and a computer readable storage medium are provided, by which sample unit sets are constructed based minimum labeled sample units that are labeled manually, and labeled training samples are generated based on such sample unit sets, thereby generating the labeled training samples automatically to a certain degree. Therefore, manual participation can be reduced, and the time cost and the economic cost for obtaining the labeled training samples are reduced.

In another aspect, in the natural language processing, the existing deep learning model cannot meet many application requirements in the vertical field. One hotspot of the specific applications in the vertical field is pre-trained classification models. However, due to difference between data of general, universal texts for the pre-training and real text data in the vertical field for the subsequent processing, even if a final classification model is obtained through finely adjusting the pre-trained classification model by utilizing the real text data in the vertical field, an output result of the final classification model is still not ideal.

In view of the above, according to another aspect of the present disclosure, it is proposed to utilize a model that is pre-trained based on texts not exclusively belonging to a specific field (such as a general, universal text) in combination with a model that is not pre-trained, and an information processing device is provided accordingly. The information processing device stores an identification and classification model for texts of the specific field. In the model, a word embedding extraction model pre-trained by using the text not exclusively belonging to the specific field is combined with a contextual representation model not pre-trained, thus obtaining good feature representation capability from the word embedding extraction model, and good contextual representation capability in the specific field from the contextual representation model, thereby improving the final identification and classification performance of the entire model.

Subsequently, embodiments according to the above aspects of the present disclosure are described in detail with reference to the drawings.

2. Configuration Examples of an Information Processing Device According to a First Embodiment The information processing device according to the first embodiment of the present disclosure relates to generating labeled training samples automatically to a certain degree.

2.1 Configuration Example of the Information Processing Device

FIG. 1 shows a block diagram of a configuration example of an information processing device according to a first embodiment of the present disclosure.

As shown in FIG. 1, the information processing device 100 may include a construction unit 110 and a generation unit 120.

Here, various units in the information processing device 100 each may be included in processing circuitry. It should be noted that, the information processing device 100 may include one or more processing circuitry. Further, the processing circuitry may include various discrete functional units to perform different functions and/or operations. It should be noted that, the functional units may be physical entities or logical entities, and units with different names may be implemented by the same physical entity.

The construction unit 110 may be configured to construct, for each of multiple indexes, a sample unit set for the index based on multiple minimum labeled sample units related to the index that are obtained and labeled from an original sample set. The generation unit 120 may be configured to extract, for at least a part of the constructed multiple sample unit sets, a minimum labeled sample unit from each sample unit set, and generate a labeled training sample based on the extracted minimum labeled sample unit.

In the context of the present disclosure, the index may be related to tasks to which labeled training samples are to be applied, and one index may correspond to one task (or may be equivalent to one task where appropriate). For example, if the constructed labeled training samples are to be applied to classification tasks subsequently, one index may correspond to one classification task. For each of the multiple indexes, the minimum labeled sample unit related to the index can be labeled with one of multiple predetermined labels for a classification task with respect to the index.

Preferably, the labeled training samples generated by using the information processing device 100 according to the embodiment may be training samples to be applied to classification tasks. In this case, for each of the multiple indexes, the minimum labeled sample unit related to the index is labeled with one of multiple predetermined labels for a classification task with respect to the index. The minimum labeled sample unit is further described in describing the preprocessing for obtaining the minimum labeled sample unit later.

With the information processing device 100 according to the embodiment, the labeled training samples suitable for multiple tasks (multiple labels and multiple tasks) are generated automatically to a certain degree. Therefore, manual participation can be reduced, thereby reducing the time cost and the economic cost for obtaining the labeled training samples.

The information processing device 100 according to the embodiment may be applied to various types of original samples or original sample sets, including but not limited to an original text sample, an original image sample, or the like. Preferably, the original sample set may include multiple original text samples. In this case, each of the multiple indexes may be related to specific content involved in the text samples, and each minimum labeled sample unit may include a minimum set of consecutive sentences for describing the corresponding index, for example.

For facilitating illustration, details of processing performed by the information processing device 100 and units thereof, as well as relevant preprocessing, are described by taking the text sample as an example in conjunction with specific application scenarios. However, based on the present disclosure, those skilled in the art may appropriately apply the information processing device according to the embodiment to various scenarios and apply the information processing device to another type of original sample other than the text sample.

First, it is assumed that the labeled training samples generated by the information processing device 100 are to be applied to an application scenario in which user comments on electronic products such as an earphone are to be analyzed and related intention is to be determined. For user comments on an earphone on a commodity page of an online mall, for example, it is expected to analyze feedback on the earphone from the users with respect to N indexes (for example, sound quality, noise reduction, appearance, cost-to-performance ratio, and Bluetooth performance, and the like, where N is a natural number), and to predict the sentiment (for example, one of M types of sentiments such as positive, negative and neutral, where M is a natural number) of the description regarding the index. The above processing substantially involves identifying a part related to the corresponding index from the user comments and classifying the sentiments of the identified part. This relates to a typical problem of multiple labels and multiple tasks in the vertical field, and the problem can be solved by the deep learning model obtained by training based on the labeled training samples.

In view of the above, it is assumed that more than one hundred thousand pieces of user comments on the earphone are collected as original samples, and it is expected to generate labeled training samples for training the above-mentioned deep learning model automatically to a certain degree by using the original samples.

2.1.1 Preprocessing for Obtaining the Minimum Labeled Sample Units

A concept of the minimum labeled sample unit is put forward in the present disclosure. That is, a standard for the minimum labeled sample unit is designed, and the minimum labeled sample unit is obtained from the original sample set.

For example, in consideration of the above example of user comments on the earphone, it is assumed that feedback on the earphone from the users is analyzed with respect to N=13 indexes (for example, sound quality, noise reduction, appearance, cost-to-performance ratio, Bluetooth performance and the like), and it is expected that sentiment of description regarding each index belongs to one of M=3 types (for example, positive, negative or neutral). In this case, for one piece of user comment, it is expected that the user comment is labeled with an index related to the comment and a label regarding a sentiment type. In other words, it is expected that each piece of user comment used as the final labeled training sample is labeled with labels corresponding to respective indexes related to the user comment, wherein each label indicates a corresponding index and one of M types corresponding to the index. If a piece of user comment relates to all the N indexes, the user comment will have N labels after being labeled. Optionally, a label of noise type may be defined and labeled as described in detail hereinafter.

The minimum labeled sample units, which are to be used for generating labeled training samples having the above form finally, can be obtained by manual preprocessing in various appropriate manners. Here, details of preprocessing for obtaining the minimum labeled sample unit are described by taking user comments on the earphone as an example.

For example, an application range of each index may be defined firstly. For example, an application range of the index "sound quality" may be defined as follows: direct comments on sound effect, timbre and tone quality; comments on definition; comments on various frequency bands and audio domain; and comments on parsing effects. In addition, a harsh sound, distortion and an abnormal sound and so on are also the sound quality effect, while "silence" may not be classified into the sound quality effect.

Subsequently, a feature key word or phrase describing each index may be defined according to the application range of the index defined above, and thereby an index feature library can be constructed. For example, a feature library consisting of feature key words describing the sound quality may include {sound effect, medium tone, bass, treble, low frequency, medium frequency, high frequency, sound, audio domain, voice, LDAC, HIFI, popular, parsing, clear, tone, . . . }. In a similar manner, index feature libraries for all the N=13 indexes may be constructed.

In addition, a labeling rule (corresponding to a classification rule) for each index is to be defined. As an example, a label (that is, a tag) for the related sample may include two parts. A first part indicates a serial number of the index, for example, serial numbers corresponding to 13 indexes such as sound quality, noise reduction, appearance, cost-to-performance ratio, Bluetooth performance and the like may be letters "A", "B", "C", "D" and "E" and so on in an alphabet order. A second part may indicate a sentiment type determined for the index, for example, "100" indicates positive (active) description and comments on the index, "001" indicates negative (passive) description and comments on the index, and "010" indicates neutral description and comments on the index. A standard for determining positive, negative or neutral may be determined based on sentimental tendency of words in the description and overall sentimental tendency expressed by all related words. In addition, alternatively, a label including the above two parts may be not used, and the labeling manner may be designed as a whole. That is, the entire label indicates a combination of the index and the type. Forms of the labels are not described in detail here.

In this manner, the application ranges and the labeling rules of all the N=13 indexes may be defined.

Optionally, an application range and a labeling rule for noise samples may be additionally defined. In this example, noise may be defined as text part interfering feature classification of indexes, and may be classified into relevant noise and irrelevant noise. The relevant noise has certain similarity with features of indexes (or is relevant to description of the index but involves no sentiment), while the irrelevant noise is completely irrelevant to features of the indexes. As an example, for the index "sound quality", an example of the relevant noise may be "the sound is not loud, and is satisfactory as a whole". The text sample includes no comments on the sound quality effect, but involves description of sound volume. As another example, for the index "Bluetooth performance", an example of the relevant noise is "the mobile network connection is not stable sometimes, and playing of songs is not fluent". The sample involves the description of the mobile network rather than the Bluetooth performance. An example of the irrelevant noise for all the 13 indexes may be "it is just obtained today, and it is expected to bring surprise to me".

Similar to the labels of text samples that are substantially related to the index, a label (that is, a tag) of a noise sample also may include two parts. A first part indicates a serial number of indexes related to the noise samples or indicates that the noise sample is irrelevant to all the indexes. For example, a first part of a label of a noise sample related to one of the indexes such as sound quality, noise reduction, appearance, cost-to-performance ratio, Bluetooth performance and the like may be a serial number of a corresponding index, for example, a corresponding letter among "A", "B", "C", "D", "E" . . . , in an alphabet order. A first part of a label of a noise sample irrelevant to all the 13 indexes may be a serial number "Z" indicating irrelevant to all the indexes. A second part of the label of the noise sample may be "000", indicating that the sample is noise. For example, an example of the relevant noise sample for the sound quality index is "the sound is not loud, and is satisfactory as a whole", which may be labeled with "A000". An example of the relevant noise sample for the Bluetooth index is "the mobile network connection is not stable sometimes, and playing of songs is not fluent", which may be labeled with "E000". An example of the noise sample irrelevant to respective indexes is "it is just obtained today, and it is expected to bring surprise to me", which may be labeled with "Z000".

In this manner, the ranges and labeling rules of the relevant noise and the irrelevant noise for all the N=13 indexes may be defined.

A minimum labeled sample unit may be extracted and labeled based on the application ranges and labeling rules respectively defined for all the N=13 indexes. Here, the minimum labeled (labeling) sample unit may be defined as a minimum set of consecutive sentences for describing the index, for example. In addition, the extraction of the minimum labeled (labeling) sample unit may involve extracting a minimum set of consecutive sentences containing feature key words in the index feature library, for example.

As an example, for the "sound quality" index, it is assumed that an example of the original sample is "clear sound, good effect, shocking bass, bright treble. Dazzling appearance, yet a little high price. Purchased for boyfriend. Wish he would like it". The minimum labeling sample unit for the index "sound quality" extracted from this original sample based on the feature keywords (bass, treble, sound) in the index feature library of the sound quality may be "clear sound, good effect, shocking bass, bright treble", which may be labeled with "A100", indicating positive description and comments on the sound quality.

In this manner, a desired number of minimum labeled sample units may be extracted and labeled for all the N=13 indexes. In an example, in a case that one hundred thousand to several hundred thousands of training samples are required, tens of thousands (for example, ten thousands to thirty thousands) of original samples may be extracted from the more than one hundred thousands of original samples to perform labeling for the minimum labeling sample units, and thus obtain the minimum labeled sample units which have been labeled, for subsequent use.

During this process, in order to improve the manual labeling efficiency, a user interface (UI) pre-designed may be adopted to assist the manual labeling process, for example. In an example, the UI may highlight the related feature key words based on the index feature libraries that have been constructed in advance, thereby improving the manual labeling efficiency according to the attention mechanism.

In addition, optionally, in a case that the application range and the labeling rule for the noise sample are defined, a predetermined number of noise texts may be extracted from the original sample set, and preferably, the noise texts may include irrelevant noise and/or relevant noise for the respective indexes, for subsequent processing and use.

Taking the user comments on the earphone as an example, details of preprocessing for extracting and labeling of the minimum labeled sample units according to the application range and the labeling rule for the index are described above. Although in the above description, the application range and the labeling rule for the index are used for the extracting and labeling of the minimum labeled sample unit, the application range and the labeling rule for the index may be used to directly label the original sample. In other words, the minimum labeled sample unit is finally used to generate labeled training samples in a form similar to the form of the labeled original samples, and thus the application range and the labeling rule for the indexes that are suitable for labeling the original samples may be used during the preprocessing for the extracting and labeling of the minimum labeled sample unit.

Based on the above description, those skilled in the art may understand that for different original samples and/or application scenarios, appropriate application ranges and labeling rules for the indexes may be defined by using various appropriate manners, and the preprocessing for extracting and labeling of the minimum labeled sample units is performed accordingly, as long as the minimum labeled sample units meeting the requirements can be obtained. For example, for the original text sample, it is only required that a minimum set of consecutive sentences describing the index can be extracted from the original text sample (for example, extracting a minimum set of consecutive sentences containing feature key words in the index feature library).

2.1.2 Processing Related to the Construction Unit

Subsequently, processing related to the construction unit is described.

As described above, the construction unit 110 may be configured to construct, for each of multiple indexes, a sample unit set for the index according to multiple minimum labeled sample units related to the index which are obtained and labeled from an original sample set.

For example, in consideration of the example of user comments on the earphone as discussed above, the construction unit 110 may be configured to construct, for each of N=13 indexes, a sample unit set for the index according to minimum labeled sample units related to the index which are obtained from an original sample by preprocessing. For example, the construction unit 110 may construct 13 sample unit sets Set1, Set2, Set3, . . . , Set13 for all the 13 indexes such as sound quality, noise reduction, appearance, cost-to-performance ratio and Bluetooth performance and the like.

Here, preferably, each minimum labeled sample unit in the sample unit set constructed by the construction unit 110 relates to only one index. For example, the minimum labeled sample unit in the sample unit set constructed for the sound quality relates to sound quality only, and is labeled with only one of labels "A100", "A001" and "A010" related to the sound quality. Such configuration is beneficial to subsequent processing. Alternatively, it can be designed that the number of indexes related to each minimum labeled sample unit in the sample unit set is not limited to one, and details thereof are not described herein.

2.1.3 Processing Related to the Generation Unit (First Configuration Example)

Subsequently, processing of the generation unit is described with reference to a first configuration example of the generation unit shown in FIG. 2.

Figure 2:
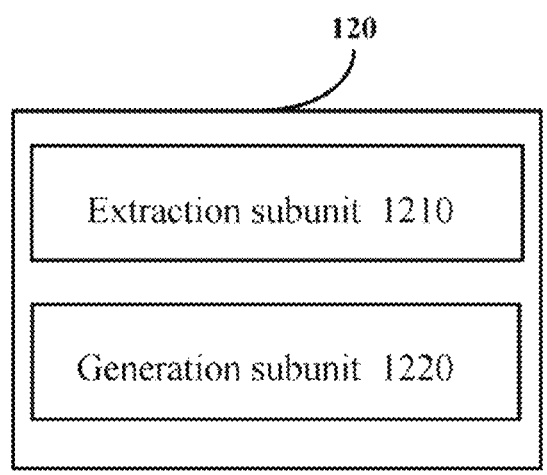
FIG. 2 shows a block diagram of a first configuration example of a generation unit in the information processing device according to the first embodiment of the present disclosure.

As shown in FIG. 2, the generation unit 120 in the first configuration example may include an extraction subunit 1210 and a generation subunit 1220. For example, in consideration of the example of user comments on the earphone as discussed above, for at least a part of the constructed 13 sample unit sets Set1, Set2, Set3, . . . , Set13, the extraction subunit 1210 may be configured to extract the minimum labeled sample unit from each sample unit set, and the generation subunit 1220 may be configured to generate labeled training samples based on the extracted minimum labeled sample units.

Here, the "at least a part of sample unit sets" may be specified according to the labeled training samples required to be generated, for example. In an example, if there are not enough labeled training samples for some indexes or for a specific index, a corresponding sample unit set may be specified for such an index and thus labeled training samples related to the index are generated.

Preferably, the extraction subunit 1210 may randomly extract a minimum labeled sample unit from each of the at least part of sample unit sets. Here, it is assumed that each minimum labeled sample unit in the sample unit set constructed by the construction unit 110 relates to only one index. In this case, the extraction subunit 1210 randomly extracts a minimum labeled sample unit from a given sample unit set, which means that the extracted minimum labeled sample unit relates to only the index of the given sample unit set and has only one label related to that index. In this manner, it is beneficial to directly determine the number and content of indexes related to the extracted minimum labeled sample units according to the operation process of the extraction subunit 1210.

The "at least a part of sample unit sets" related to the processing of the generation unit 120 may include one or more sample unit set. In a case that the sample unit set related to the processing of the generation unit 120 includes one sample unit set, the extraction subunit 1210 may randomly extract one minimum labeled sample unit from the sample unit set, and the generation subunit 1220 may take the minimum labeled sample unit as the generated labeled training sample.

In addition, in a case that the sample unit set related to the processing of the generation unit 120 includes more than one sample unit set, for example 3 sample unit sets, the extraction subunit 1210 may extract one minimum labeled sample unit from each of the 3 sample unit sets, and the generation subunit 1220 may generate labeled training samples based on the extracted 3 minimum labeled sample units in total.

In a preferred embodiment, the generation subunit 1220 may be configured to generate a labeled training sample by randomly combining the minimum labeled sample units extracted by the extraction subunit 1210. The labeled training sample generated by the generation subunit may be a text sample in a form of paragraph, for example.

The first configuration example of the information processing device according to the embodiment of the present disclosure is described above with reference to FIG. 1 and FIG. 2. With the information processing device according to the embodiment, after the minimum labeled sample units are obtained, labeled training samples suitable for processing of multiple tasks (multiple labels and multiple tasks) can be generated automatically. Therefore, with the information processing device according to the embodiment, manual participation can be reduced, and thus the time cost and the economic cost for obtaining the labeled training samples can be reduced.

2.2 Preferred Configuration Examples of the Generation Unit

Subsequently, preferred configuration examples of the generation unit, that is, the second to the fourth configuration examples of the generation unit, are described.

2.2.2 Second Configuration Example of the Generation Unit

Firstly, a second configuration example of the generation unit is described with reference to FIG. 3.

Figure 3:
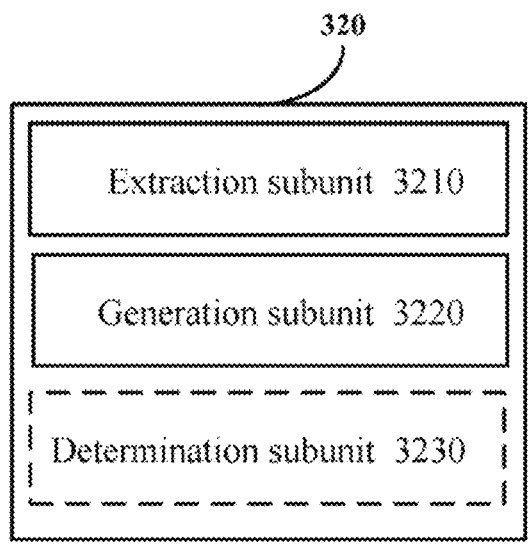
FIG. 3 shows a block diagram of a second configuration example of the generation unit of the information processing device according to the first embodiment of the present disclosure.

FIG. 3 shows a block diagram of a second configuration example of the generation unit in the information processing device according to the first embodiment of the present disclosure.

As shown in FIG. 3, the generation unit 320 in the second configuration example may include an extraction subunit 3210 and a generation subunit 3220. The extraction subunit 3210 and the generation subunit 3220 respectively correspond to the extraction subunit 1210 and the generation subunit 1220 of the generation unit 120 shown in FIG. 2. The generation unit 320 shown in FIG. 3 differs from the generation unit 120 shown in FIG. 2 in that: the generation unit 320 further includes an optional determination subunit 3230. The following description focuses on the determination subunit 3230.

The determination subunit 3230 may be configured to randomly determine at least a part of sample unit sets among the constructed multiple sample unit sets. Preferably, in a case that the generation unit 320 includes the determination subunit 3230, various subunits in the generation unit may be configured to repeatedly perform respective processing, to obtain a training sample set including multiple labeled training samples. That is, the determination subunit 3230 may repeatedly determine at least a part of sample unit sets randomly, the extraction subunit 3210 may repeatedly extract (for example randomly extract) a minimum labeled sample unit from each of the determined sample unit sets, and the generation subunit 3230 may repeatedly generate a labeled training sample based on the extracted minimum labeled sample units. Accordingly, the repeated processing by all the subunits may generate a labeled training sample for each time, and multiple labeled training samples may be generated by multiple times of the repeated processing, thereby obtaining the training sample set.

In the above manner, based on the sample unit sets constructed by the construction unit, a training sample set including a large number of labeled training samples can be constructed automatically, thereby greatly reducing the degree of manual participation and improving the labeling efficiency. Theoretically, there is a forward exponential relationship between the number of labels and a working load of manual labeling. Therefore, as the related indexes and/or types corresponding to each index increase and thus the number of labels increase, it is more beneficial to generate the training sample set automatically by using the generation unit in the configuration example, and the time cost is reduced.

In addition, in a case that the number of required training samples is greater than the total number of original samples in the original sample set, the generation unit in the configuration example make it possible to generate the training samples meeting requirements. For example, for the constructed 13 sample unit sets Set1, Set2, Set3, . . . , Set13, it is assumed that the numbers of minimum labeled sample units in the respective sample unit sets are respectively C1, C2, C3, . . . , C13. In this case, repeated processing is performed by using the generation unit in the configuration example, and up to a max number of Nmax=C1*C2* C3 . . . *C13 labeled training samples can be generated theoretically, and the number is far greater than the total number of the original samples.

2.2.3 Third Configuration Example of the Generation Unit

Subsequently, a third configuration example of the generation unit is described with reference to FIG. 4 and FIG. 5.

Figure 4:
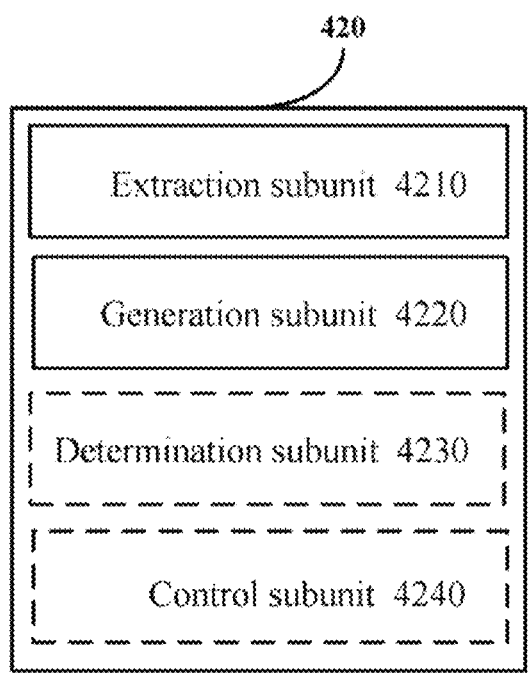
FIG. 4 shows a block diagram of a third configuration example of the generation unit of the information processing device according to the first embodiment of the present disclosure.

FIG. 4 shows a block diagram of a third configuration example of the generation unit in the information processing device according to the first embodiment of the present disclosure.

As shown in FIG. 4, the generation unit 420 in the third configuration example may include an extraction subunit 4210, a generation subunit 4220 and a determination subunit 4230. The extraction subunit 4210, the generation subunit 4220 and the determination subunit 4230 respectively correspond to the extraction subunit 3210, the generation subunit 3220 and the determination subunit 3230 of the generation unit 320 shown in FIG. 3. The generation unit 420 shown in FIG. 4 differs from the generation unit 320 shown in FIG. 3 in that: the generation unit 420 further includes an optional control subunit 4240. The following description focuses on the control subunit 4240.

The control subunit 4240 may be configured to: determine an expected distribution of the numbers of indexes related to labeled training samples in the obtained training sample set, based on at least an original distribution of the numbers of indexes related to original samples in the original sample set, and control the extraction subunit 4210, the generation subunit 4220 and the determination subunit 4230 to repeatedly perform their respective processing, so that the actual numbers of indexes related to the labeled training samples follow the expected distribution.

Figure 5:
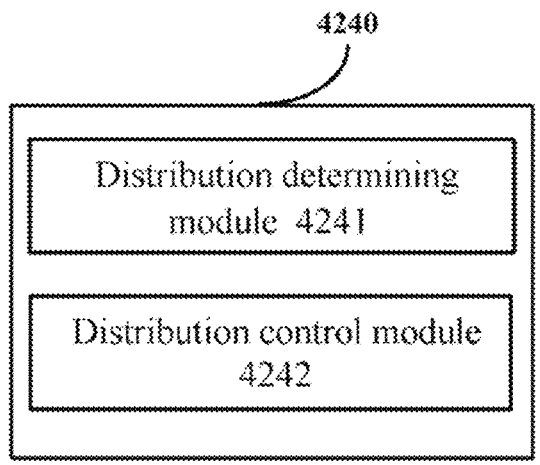
FIG. 5 shows a block diagram of a configuration example of a control sub-unit in the third configuration example of the generation unit shown in FIG. 4.

FIG. 5 shows a configuration example of the control subunit 4240 shown in FIG. 4. As shown in FIG. 5, the control subunit 4240 may include a distribution determining module 4241 and a distribution control module 4242. The distribution determining module 4241 may be configured to determine an expected distribution based on at least an original distribution of the numbers of indexes related to original samples in the original sample set. The distribution determining module 4241 determines the expected distribution based on at least the original distribution, so that the expected distribution may reflect or simulate the original distribution to a certain degree, thus good performance can be obtained when a model obtained by training by using a training sample set following such expected distribution is applied to real texts following the original distribution.

In an example, the distribution determining module 4241 may be configured to determine the expected distribution so that it is based on at least a normal distribution whose mean and variance are based on a mean and a variance of the numbers of indexes related to the original samples in the original sample set.

Here, it is assumed that during the preprocessing, a part of samples (for example 10% to 20% of original samples) are extracted from the original samples and are labeled manually, and an original distribution of the numbers of indexes related to the extracted original samples is obtained, that is, an occurrence probability of samples that are related to each number of indexes among the original samples is obtained. For example, the number count(k) of original samples that are related to k indexes may be determined, where k=0, 1, 2, 3, . . . , 13. An occurrence probability P(k) of samples that are related to k indexes among the original samples is calculated according to the following equation (1):

$$P(k)=\text{count}(k)/\Sigma_{n=0}^{13}\text{count}(n) \quad \text{equation (1)}$$

The distribution determining module 4241 may determine a desired normal distribution based on the original distribution P(k) of the number of indexes related to the original samples obtained in the above manner. For example, the distribution determining module 4241 may calculate an average μ of the numbers of indexes related to the original samples based on the original distribution P(k) according to the following equation (2), and calculate a standard deviation (variance) σ of the numbers of indexes related to the original samples according to the following equation (3):

$$\mu=\Sigma_{k=0}^{13}P(k)*k \quad \text{equation (2)}$$

$$\sigma^2=\Sigma_{k=0}^{13}(\mu-k)^2 \quad \text{equation (3)}$$

After the average μ and the variance σ are obtained in the above manner, the distribution determining module 4241 may determine the normal distribution according to the following equation (4):

$$f(x) = \frac{1}{\sqrt{2\pi}\sigma} \exp\left(-\frac{(x-\mu)^2}{2\sigma^2}\right) \quad \text{equation (4)}$$

where f(x) indicates an occurrence probability of samples related to indexes the number of which is x.

In an example, the distribution determining module 4241 may directly determine the normal distribution shown in equation (4) as an expected distribution of the numbers of indexes related to labeled training samples among the obtained training sample set.

The above normal distribution is used as the expected distribution, thereby solving potential imbalance problem in the original samples. Imbalance may exist for different types of samples among the original samples. For example, the number of samples belonging to a specific type is excessive, resulting in over-fitting problem. Alternatively, the number of samples belonging to a specific type is few, resulting in under-fitting problem. The two types of problems discussed above affect final precision of a model obtained by training based on the original samples. The normal distribution is relatively balanced. The imbalance of the original samples can be adjusted to a certain degree (equivalent to smoothing the distribution of the samples), with the normal distribution determined by the distribution determining module 4241 based on the original distribution according to above equation (4), thereby effectively avoiding the problems of over-fitting and under-fitting.

In a preferred embodiment, the distribution determining module 4241 is further configured to determine an expected distribution by adjusting the normal distribution with the original distribution, so that in the expected distribution, an occurrence probability of the number of indexes related to the labeled training samples is equal to a weighted average of a first occurrence probability determined according to the normal distribution and a second occurrence probability determined according to the original distribution.

For example, the distribution determining module 4241 may calculate an occurrence probability $f_1(k)$ of the number of indexes related to the labeled training samples according to the following equation (5), as a probability of an expected distribution:

$$f_1(k)=(f(k)\alpha P(k))/2 \quad \text{equation (5)}$$

In which, f(k) indicates the first occurrence probability determined according to the normal distribution, and it can be obtained by setting x in the above equation (4) as 0, 1, 2, 3, . . . , 13; and P(k) indicates the second occurrence probability determined according to the original distribution. Here, a weight coefficient α ranging from 0 to 1 is set for the second occurrence probability, so as to appropriately determine the final probability of the expected distribution.

In the equation (5), the normal distribution is further adjusted with the original distribution. In an actual application, in a case that the normal distribution determined according to the equation (4) differs substantially from the original distribution, a weighted average of the original distribution and the normal distribution may be used as the expected distribution, so that the expected distribution is closer to the original distribution when compared to the normal distribution. With the samples following the expected distribution, the potential imbalance existing in the original samples is adjusted, and an excessive difference between the normal distribution and the original distribution is avoided.

In an actual application, for example, normalization can be performed on the calculated probability of $f_1(k)$ of the expected distribution according to the following equation (6), to calculate the final probability $f_2(k)$:

$$\Sigma_{k=0}^{13} f_2(k)=1$$

$$f_2(k)=f_1(k)*[1/\Sigma_{k=0}^{13} f_1(k)] \quad \text{equation (6)}$$

When the distribution determining module 4241 determines the expected distribution according to the above manner, that is, the occurrence probability of the number of indexes related to the labeled training samples, the distribution control module 4242 determines, according to the occurrence probability of each number of indexes and a total number of labeled training samples to be generated, the number of labeled training samples to be generated related to that number of indexes, and control the extraction subunit 4210, the generation subunit 4220 and the determination subunit 4230 to perform their respective processing repeatedly, to generate the requited labeled training samples of the determined number, so that the actual numbers of indexes related to the labeled training samples follow the expected distribution.

For example, the following example is considered. 13 sample unit sets Set1, Set2, Set3, . . . , Set13 have been constructed for N=13 indexes, respectively; the numbers of minimum labeled sample units in the 13 sample unit sets are respectively C1, C2, C3, . . . , C13, where Ci is a natural number ranging from 1000 to 2000 (i=1, 2, . . . , 13, indicating a serial number of the sample unit set); and a minimum labeled sample unit of each sample unit set relates to only one index corresponding to the sample unit set (that is, having only one label related to the index). It is expected to generate a training sample set including samples of a sample number Nsample=3000000 based on such sample unit sets, and the numbers of indexes related to the labeled training samples follow the expected distribution determined according to the above equation (6), that is, the occurrence probability of the labeled training samples that are related to k indexes is $f_2(k)$, where k=0, 1, 2, 3, . . . , 13.

Therefore, the distribution control module first determines the number of training samples related to k indexes according to the following equation (7):

$$N\text{sample}_k = N\text{sample}*f_2(k) \quad \text{equation (7)}$$

Subsequently, for k=1, 2, . . . , 13, labeled training samples of the number $N\text{sample}_k$ are generated.

Taking k=1 as an example, the distribution control module 4242 may control respective subunits to repeatedly perform the following processing for $N\text{sample}_1$ times: controlling the determination subunit 4230 to randomly determine a sample unit set Seti from 13 sample unit sets according to a first random function for implementing a combination equation $C_{13}^1$; controlling the extraction subunit 4210 to randomly extract a minimum labeled sample unit from Ci minimum labeled sample units in the determined sample unit set Seti according to a second random function for implementing a combination equation $C_{ci}^1$; and controlling the generation subunit 4220 to directly use the extracted minimum labeled sample unit as the generated labeled training sample. Each labeled training sample among the generated $N\text{sample}_1$ labeled training samples relates to only k=1 index.

Taking k=2 as an example, the distribution control module 4242 may control respective subunits to repeatedly perform the following processing for $N\text{sample}_2$ times: controlling the determination subunit 4230 to randomly determine two sample unit sets Seti and Setj (i, j are two different natural numbers ranging from 1 to 13, to indicate serial numbers of two different sample unit sets) from 13 sample unit sets, according to a first random function for implementing a combination equation $C_{13}^2$; controlling the extraction subunit 4210 to randomly extract a minimum labeled sample unit from Ci minimum labeled sample units of the determined sample unit set Seti and randomly extract a minimum labeled sample unit from Cj minimum labeled sample units of the determined sample unit set Setj, according to second random functions for implementing combination equations $C_{ci}^1$ and $C_{cj}^1$, respectively; and controlling the generation subunit 4220 to generate a labeled training sample by randomly combining (that is, randomly arranging) the extracted two minimum labeled sample units, according to a third random function for implementing a permutation equation $P_2^2$. Each labeled training sample of the Nsample$_2$ labeled training samples thus generated relates to k=2 indexes.

In this manner, for k=1, 2, . . . , 13, the distribution control module 4242 may control subunits 4210 to 4230 to perform related processing repeatedly for Nsample$_k$ times, to generate Nsample$_k$ labeled training samples, wherein each labeled training sample relates to k indexes. All these labeled training samples together constitute the generated training sample set SampleSet.

In the above example, units in each unit set relate to a single index, thereby optimizing or simplifying control on the number of indexes related to the generated labeled training sample. That is, by controlling just the number k of the sample unit sets that are randomly selected each time based on the first random function for implementing a combination equation $C_{13}^k$, for example, the number k of indexes that are related to the finally generated labeled training sample can be controlled.

However, embodiments of the present disclosure are not limited to the above description. Based on the above preferred examples, different configurations for the sample unit sets may be adopted, and the distribution control module 4242 may perform appropriate control accordingly. For example, minimum labeled sample units in each sample unit set may relate to more than one index. For example, a specific minimum labeled sample unit may relate to two or more indexes. In this case, the number of indexes related to the finally generated labeled training sample may be controlled comprehensively (for example, once a labeled training sample is generated, a label thereof is read, so as to determine the number of indexes related to the sample), and a distribution of the numbers of indexes related to the labeled training samples in the training sample set is accordingly controlled. Details are not described here.

2.2.4 Fourth Configuration Example of the Generation Unit

Subsequently, a fourth configuration example of the generation unit is described with reference to FIG. 6.

Figure 6:
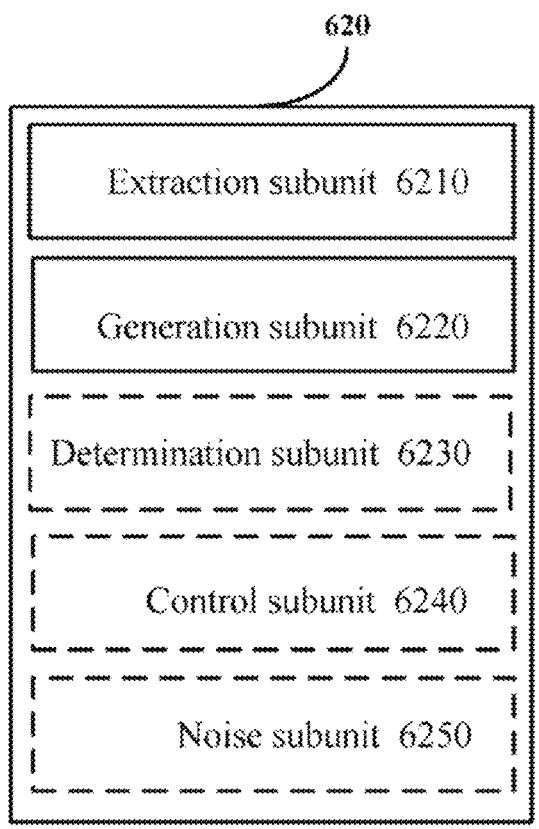
FIG. 6 shows a block diagram of a fourth configuration example of the generation unit of the information processing device according to the first embodiment of the present disclosure.

FIG. 6 shows a block diagram of the fourth configuration example of the generation unit in the information processing device according to the first embodiment of the present disclosure.

As shown in FIG. 6, the generation unit 620 of the fourth configuration example may include an extraction subunit 6210, a generation subunit 6220, a determination subunit 6230 and a control subunit 6240, which respectively correspond to the extraction subunit 4210, the generation subunit 4220, the determination subunit 4230 and the control subunit 4240 of the generation unit 420 shown in FIG. 4. The generation unit 620 shown in FIG. 6 differs from the generation unit 420 shown in FIG. 4 in that: the generation unit 620 further includes an optional noise subunit 6250. The following description focuses on the noise subunit 6250.

The noise subunit 6250 may be configured to include or incorporate noise samples of a predetermined ratio in the training sample set. For example, according to the manner described above with reference to FIG. 4 and FIG. 5, under control of the control subunit 6240, the extraction subunit 6210, the generation subunit 6220 and the determination subunit 6230 generate a training sample set SampleSet of labeled training samples for which the numbers of related indexes follows the expected distribution, and the noise subunit 6250 may add noise samples of a predetermined ratio to the training sample set.

Here, the noise samples may be noise samples in the original samples which are prelabeled according to a labeling rule related to the noise samples in the manner described above (2.1.1 preprocessing for obtaining the minimum labeled sample unit), for example, and may include either or both of the relevant noise and the irrelevant noise.

In a preferred embodiment, the noise samples may be considered as samples for which the number of related indexes is 0 among the original samples. In this case, the noise samples in the final training sample set may follow the expected distribution described above (2.2.3 third configuration example of the generation unit). For example, according to the manner shown by equation (7), the required number, Nsample$_0$=Nsample*$f_2(0)$, of noise samples is determined according to the total number Nsample of samples in the final training sample set and an occurrence probability $f_2(0)$ of samples related to 0 index in the expected distribution, and Nsample$_0$ noise samples are included in the training sample set SampleSet.

Alternatively, noise samples of a predetermined ratio determined in other manners may be included in the training sample set. For example, it is assumed that the final noise sample set is supposed to include noise samples of a predetermined ratio of 30%, and it is determined that the number of noise samples to be added is Nnoise=Nsample*30%. The noise subunit 6240 may add noise samples of the number Nnoise that are obtained from the original samples into SampleSet, thereby obtaining the training sample set including noise samples of 30%.

In this way, the training sample set including noise samples may be obtained, thereby being beneficial to improve precision for subsequent training with the training sample set.

Configuration examples of the information processing device according to the first embodiment of the present disclosure are described above. As described above, with the information processing device according to the first embodiment, after the minimum labeled sample unit is obtained, labeled training samples for multiple tasks (multiple labels and multiple tasks) can be automatically generated. Therefore, with the information processing device according to the embodiment, manual participation can be reduced, and the time cost and the economic cost for obtaining the labeled training samples can be reduced.

3. Information Processing Method According to the First Embodiment

Corresponding to the information processing device according to the first embodiment, an information processing method according to the first embodiment is provided in the present disclosure.

Figure 7:
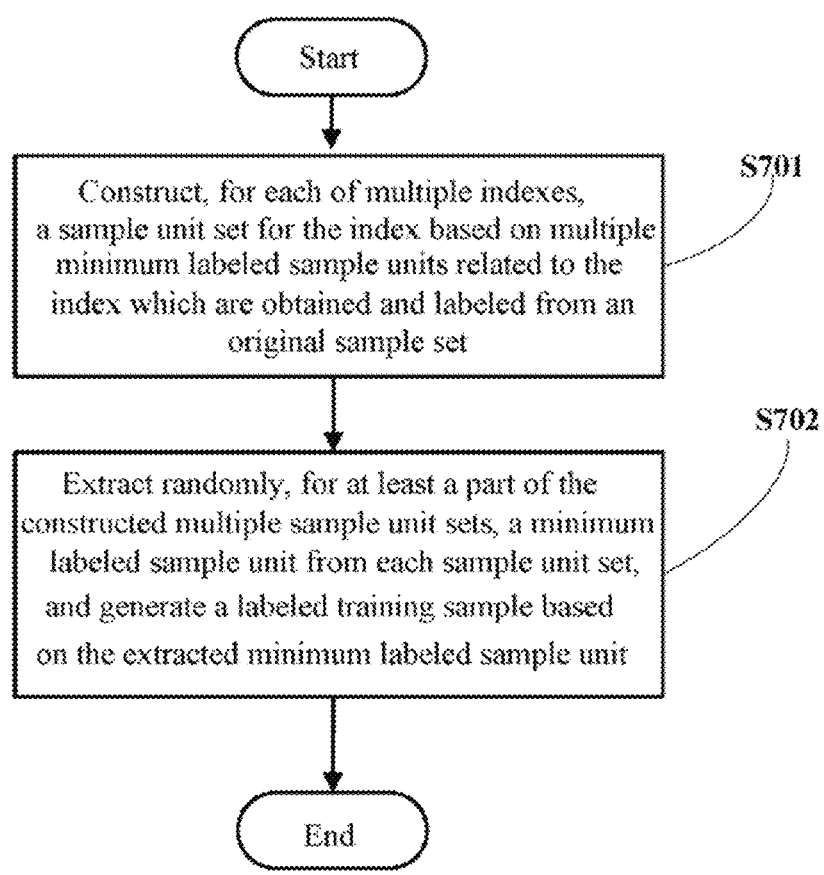
FIG. 7 shows a flowchart of a process example of an information processing method according to the first embodiment of the present disclosure.

FIG. 7 shows a flowchart of a process example of the information processing method according to the first embodiment of the present disclosure.

As shown in FIG. 7, in step S701, for each of multiple indexes, a sample unit set for the index is constructed according to multiple minimum labeled sample units related to the index which are obtained and labeled from an original sample set. Here, before step S701, through the preprocessing described in (2.1.1 preprocessing for obtaining the minimum labeled sample unit), multiple minimum labeled sample units each relate to a respective index are obtained in advance from the original sample set.

Subsequently, in step S702, for at least a part of the constructed multiple sample unit sets, a minimum labeled sample unit is extracted from each sample unit set, and a labeled training sample is generated based on the extracted minimum labeled sample unit.

Preferably, the labeled training samples generated with the information processing method according to the embodiment may be training samples to be applied to classification tasks. In this case, for each of the multiple indexes, the minimum labeled sample unit related to the index is labeled with one of multiple predetermined labels for a classification task with respect to the index.

The information processing method according to the embodiment may be applied to various types of original samples or original sample sets, including but not limited to original text samples, original image samples, and the like. Preferably, the original sample set may include multiple original text samples. In this case, each of the multiple indexes may be related to specific content involved in the text sample, and each minimum labeled sample unit may include a minimum set of consecutive sentences for describing the corresponding index.

Preferably, in step S702, the extracted minimum labeled sample units may be randomly combined to generate a labeled training sample.

Preferably, step S702 may optionally include: randomly determining at least a part of the constructed multiple sample unit sets.

In this case, in step S702, the processing of determining randomly at least a part of sample unit sets, extracting a minimum labeled sample unit and generating a labeled training sample may be repeatedly performed, to obtain a training sample set including multiple labeled training samples.

Preferably, step S702 may optionally include: determining an expected distribution based on at least an original distribution of the numbers of indexes related to original samples in the original sample set, and controlling the abovementioned processing that is performed repeatedly, so that the numbers of indexes related to the labeled training samples in the obtained training sample set follow the expected distribution.

In an example, the expected distribution may be based on at least a normal distribution whose mean and variance are based on a mean and a variance of the numbers of indexes related to original samples in the original sample set.

Preferably, the expected distribution may be determined by adjusting the normal distribution with the original distribution, so that in the expected distribution, an occurrence probability of the number of indexes related to the labeled training samples is equal to a weighted average of a first occurrence probability determined according to the normal distribution and a second occurrence probability determined according to the original distribution.

Optionally, step S702 may further optionally include: including noise samples of a predetermined ratio in the training sample set.

According to the embodiment of the present disclosure, the above method may be performed by the information processing device 100 according to the first embodiment of the present disclosure. Therefore, all embodiments of the information processing device 100 and units thereof (including subunits and modules thereof) described above each adapt to the information processing method.

4. Configuration Example of the Information Processing Device According to a Second Embodiment The information processing device according to the second embodiment of the present disclosure relates to identification and classification for texts of a specific field.

4.1 Configuration Example of the Information Processing Device

Figure 8:
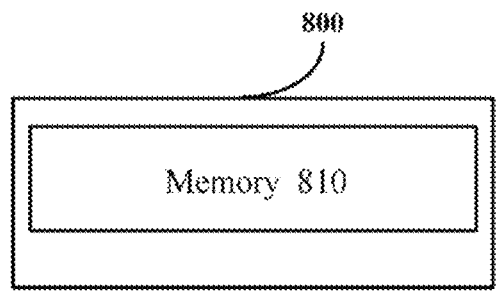
FIG. 8 shows a block diagram of a configuration example of an information processing device according to a second embodiment of the present disclosure.

FIG. 8 shows a block diagram of a configuration example of the information processing device according to the second embodiment of the present disclosure.

As shown in FIG. 8, an information processing device 800 may include a memory 810. The memory 810 may store an identification and classification model for texts of a specific field. The identification and classification model can be used to identify a part related to at least one index from inputted texts of the specific field, and perform classification on the identified part with respect to the related index. The identification and classification model may include: a word embedding extraction model that is obtained by pre-training by using at least a first text sample set not exclusively belonging to the specific field, and configured to extract (obtain) a word embedding from the inputted text; and a contextual representation model that is obtained by training by using a second text sample set of the specific field, and configured to output a result of the classification according to the word embedding extracted by the word embedding extraction model.

Here, texts of the specific field processed by the identification and classifying model stored in the memory 810 may include various text samples in the various vertical fields, for example user comments on products on a commodity page, comments on books and videos/audios on the social media, and user feedback on the manual customer service on a message board, and so on. Each index identified by the identification and classification model from the text sample relates to specific content involved in the text, for example, different aspects for analyzing the above text samples; and the classification with respect to each index may involve determining intention or sentiment (for example one of positive, negative or neutral sentiments) of user feedback or comments for the index.

For the identification and classification task for the texts of the vertical field, the identification and classification model stored in the memory 810 combines the word embedding extraction mode that is pre-trained by using the text sample set not exclusively belonging to the specific field (such as general, universal text) with a contextual representation model that is not pre-trained (a contextual representation model that is obtained by training by using the text sample set of the specific field only), so that good feature representation capability of the word embedding extraction model and good contextual representation capability of the contextual representation model in the specific field are obtained, thereby improving the final identification and classification effect, and performing classification more accurately.

In the identification and classification model stored in the memory 810, the word embedding extraction model may extract (obtain) word embedding from the inputted text samples (for example, a text sample of a paragraph), and it may extract dynamic word embedding preferably. In addition, the contextual representation model may receive, as an input, the word embedding outputted from the word embedding extraction model, and output an identification and classification result. The outputted identification and classification result may be a label distribution for the inputted text, for example, which may be in the form of a label sequence indicating a real result (that is, a probability distribution corresponding to the label sequence). Each label may include two parts: a first part indicates the identified index, and a second part indicates a type (class) determined with respect to the index.

Each of the word embedding extraction model and the contextual representation model may be implemented by a neural network model. For example, the word embedding extraction model may be implemented by a neural network with hidden layers, for example word2vec model. Preferably, the word embedding extraction model may be implemented by contextualized word embedings (CWE) model. The contextual representation model may be a recurrent neural network model, for example long short term memory (LSTM) model.

Preferably, one of the word embedding extraction model and the contextual representation model may be based on recurrent neural network (RNN), and the other of the word embedding extraction model and the contextual representation model may be based on attention mechanism.

For example, the word embedding extraction model may be based on the attention mechanism, and may be implemented by a model based on the attention mechanism in the CWE model (for example, bidirectional encoder representations from transformers (BERT)). In calculating one word embedding, the CWE model based on the attention mechanism calculates a weighted sum of the word embedding and contextual word embeddings (with weights that are corresponding parameters in the CWE model), and optionally performs normalization. This is equivalent to performing word embedding enhancement by using the contextual information of the word embedding. Therefore, the attention mechanism is introduced, and the semantic representation capability of the word embedding is increased.

In addition, the contextual representation model may be based on recurrent neural network, and may be implemented by a bi-directional long short term memory (Bi-LSTM) model, a LSTM model, or the like, for example. In an example, the contextual representation model based on the RNN model may include multiple Bi-LSTM layers, multiple LSTM layers and a full connection layer (FC). The number of each of type of layers and parameters thereof may be set appropriately.

Alternatively, the word embedding extraction model may be based on the recurrent neural network, and the contextual representation model may be based on the attention mechanism. The word embedding extraction model based on the recurrent neural network may include embeddings from language models (ELMO) implemented by Bi-LSTM. As an example, the contextual representation model based on the attention mechanism may include a neural network model based on self-attention mechanism implemented by a transformer structure including an encoder and a decoder.

The word embedding extraction model and the contextual representation model respectively adopt the attention mechanism and the RNN model, so that a "complementary" structure is formed, thereby being beneficial to improve the performance of the entire identification and classification model.

Based on the model structures and sample sets for training described above (the first text sample set not exclusively belonging to the specific field that is used for training only the word embedding extraction model in advance, and the second text sample of the specific field that is for training the entire identification and classification model), those skilled in the art may obtain optimized parameters of the identification and classification model by an appropriate training process.

For example, by the existing manners, the word embedding extraction model such as the CWE model is trained by using the first text sample set not exclusively belonging to the specific field, to obtain a pre-trained word embedding extraction model.

Subsequently, a loss function may be created based on a probability of correct identification and classification (also referred to as a probability of correct classification) of the entire identification and classification model. For example, the loss function may indicate a difference between an output result of the model and a correct result of the identification and classification. In order to minimize the loss function, end-to-end training is performed for the entire identification and classification model by using the second text sample set of the specific field, thereby obtaining optimal values of parameters in the entire model.

Based on the model structures and the training manners as described above, those skilled in the art may implement specific processes of the training by the existing manners. Details are not described herein.

4.2 Sample Sets for Training Models in an Information Processing Device

As described above, in order to train the identification and classification model stored in the memory 810 of the information processing device 800, the first text sample set not exclusively belonging to the specific field and the second text sample set of the specific field are required.

In one aspect, the first text sample set not exclusively belonging to the specific field may be obtained from general texts, and may be obtained easily by the existing manners.

In the other aspect, the second text sample set of the specific field relates to texts of the vertical field. For the text of the vertical field, it may be difficult to obtain sufficient labeled texts as training data. Therefore, in a preferred embodiment, the labeled training samples (or the training sample set) obtained by the information processing device according to the first embodiment may be used as samples in the second text sample set (or as the second text sample set) for training the model in the present embodiment, thereby solving the problem of being difficult to obtain the labeled samples of the vertical field.

For facilitating illustration, specific details of a preferred embodiment, in which the labeled training samples (or the training sample set) obtained by the information processing device according to the first embodiment are used as the samples in the second text sample set (or as the second text sample set) for training the identification and classification model, are described below in combination with an application scenario regarding user comments for the earphone. Based on the present disclosure, those skilled in the art may appropriately apply the preferred embodiment into various scenarios, and details are not described herein.

In the exemplary application scenario, an example of user comments for the earphone described in the first embodiment is considered. The identification and classification model needs to analyze the feedback on the earphone from users in terms of N=13 indexes (for example sound quality, noise reduction, appearance, cost-to-performance ratio and Bluetooth performance and so on), and thus it needs to identity a part of the user comments related to one or more of the 13 indexes among the user comments, and needs to classify the identified part into one of M=3 types with respect to the sentiment of the related indexes (for example positive, negative and neutral). Optionally, the identification and classification model may identify noise type in the inputted text.

In the preferred embodiment, at least one labeled training sample in the second text sample set may be generated by using the information processing device 100 in the first embodiment described with reference to FIG. 1 above, that is, by using the processing of the construction unit 100 and the generation unit 120 of the information processing device 100. In other words, at least one labeled training sample in the second text sample set may be obtained by: constructing, for each of multiple indexes, a sample unit set for the index based on multiple minimum labeled sample units related to the index which are obtained and labeled from an original sample set of the specific field; and extracting, for at least a part of the constructed multiple sample unit sets, a minimum labeled sample unit from each sample unit set, and generating a labeled training sample based on the extracted minimum labeled sample unit.

Here, the minimum labeled sample unit of the index is obtained in advance by the preprocessing described above for the information processing device according to the first embodiment (2.1.1 preprocessing for obtaining the minimum labeled sample unit), for example.

Preferably, for each of multiple indexes, the minimum labeled sample unit related to the index may be labeled with one of predetermined labels for a task with respect to the index. In addition, preferably, each of multiple indexes is related to specific content involved in the text of the specific field, and each minimum labeled sample unit includes a minimum set of consecutive sentences for describing the corresponding index.

For example, taking the index "sound quality" as an example, an example of the minimum labeled sample unit related to the index may be "clear sound, good effect, shocking bass, bright treble", which may be labeled with "A100". A first part "A" in the label "A100" indicates a serial number of the index related to the minimum labeled sample unit (that is, one of serial numbers "A", "B", "C", "D" and "E" and so on respectively corresponding to "sound quality", "noise reduction", "appearance", "cost-to-performance ratio" and "Bluetooth performance" and so on). A second part "100" of the label "A100" indicates a type (class) of the index related to the minimum labeled sample unit (that is, one of "100" indicating positive description and comment on the index, "001" indicating negative description and comment on the index, and "010" indicating neutral description and comment on the index).

Based on the minimum labeled sample units which are obtained and labeled from the original samples, such as the minimum labeled sample units discussed above, 13 sample unit sets Set1, Set2, Set3, . . . , Set13 are constructed for N=13 indexes (for example sound quality, noise reduction, appearance, cost-to-performance ratio and Bluetooth performance and so on), for example.

In an example, the generated at least one of labeled training samples may be generated by randomly combining minimum labeled sample units extracted from each of the at least a part of sample unit sets among the 13 sample unit sets, for example.

In an example, "the at least a part of sample unit sets" for extracting the minimum labeled sample units may be specified according to labeled training samples required to be generated, for example. In an example, if there are not enough labeled training samples for some indexes or a certain index, then a corresponding sample unit set may be specified according to such index, thereby generating labeled training samples related to such index.

In addition, alternatively, "the at least a part of sample unit sets" for extracting the minimum labeled sample units may be randomly determined among the constructed multiple sample unit sets. For example, the at least a part of sample unit sets for extracting the minimum labeled sample units may be determined randomly among the constructed 13 sample unit sets Set1, Set2, Set3, . . . , Set13, by using processing of the generation unit 320 (particularly the determination subunit 3230) described with reference to FIG. 3 in description of the information processing device according to the first embodiment.

In this case, for example, by using the processing of the generation unit 320 described with reference to FIG. 3, multiple labeled training samples can be generated by repeatedly determining at least a part of sample unit sets randomly, repeatedly extracting (for example extracting randomly) a minimum labeled sample unit from each of the determined sample unit sets, and repeatedly generating a labeled training sample based on the extracted minimum labeled sample units. In this way, a training sample set can be obtained. This training sample set may be directly used as the second text sample set of the specific field (or as a part of the second text sample set) for training the identification and classification model.

Further preferably, in the second text sample set obtained in the above method, the numbers of indexes related to the labeled training samples may follow an expected distribution that is determined based on at least an original distribution of the numbers of indexes related to original samples in the original text sample set. The labeled training samples, for which the numbers of related indexes follow the expected distribution, may at least partially simulate the original distribution, so that good performance can be obtained when the identification and classification models obtained by training by using these labeled training samples is applied to real samples following the original distribution.

In an example, the expected distribution may be determined according to at least a normal distribution whose mean and variance is based on a mean and a variance of the numbers of indexes related to original samples in the original text sample set. A specific form of the normal distribution may be determined based on the original distribution of the numbers of indexes related to original samples in the original text sample set according to the manners described with reference to equations (1) to (4). With the labeled training samples for which the numbers of related indexes follow the expected distribution, the potential imbalance existing in the original samples is adjusted by using the normal distribution which is a relatively balanced distribution, so that the identification and classification models obtained by using the labeled training samples can be trained sufficiently and appropriately, thereby obtaining good performance.

In addition, preferably, in the expected distribution, an occurrence probability of the number of indexes related to labeled training samples is equal to a weighted average of a first occurrence probability determined according to the normal distribution and a second occurrence probability determined according to the original distribution. The specific form of the expected distribution is determined by adjusting the normal distribution with the original distribution of the number of indexes related to the original samples in the original text sample set, according to the manners described above with respect to equations (5) to (6). As to the labeled training samples, for which the numbers of indexes follow the expected distribution, the potential imbalance existing in the original samples is adjusted, and an excessive difference between the original distribution and the normal distribution is avoided. Hence, the identification and classification model obtained by training by using these labeled training samples can be sufficiently and appropriately trained by using the samples whose distribution is similar the original distribution, thereby obtaining good performance.

For example, processing of the generation unit 420 and the control subunit 4240 thereof (as well as modules included therein) described above in the first embodiment with reference to FIG. 4 and FIG. 5 can be performed, so that the numbers of indexes related to labeled training samples in the obtained training sample sets follow the expected distribution. Details are not repeated here. In an example, the second text sample set obtained by the above manner may include noise samples of a predetermined ratio. For example, processing of the generation unit 620 described above with reference to FIG. 6 can be performed, so that the training sample set including noise samples of a predetermined ratio is obtained, as the second text sample set. Details are not described herein.

4.3 Application Examples of Information Processing Device

The information processing device according to the second embodiment that includes the memory storing the identification and classification model may be well applied to various vertical fields, thereby obtaining good processing performances. Application examples of the information processing device according to the second embodiment are described below with reference to FIG. 9 and FIG. 10.

Figure 9:
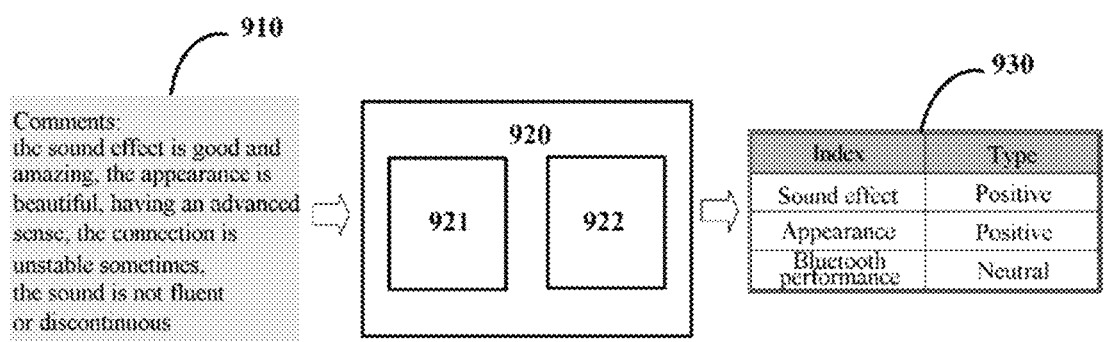
FIG. 9 shows a schematic graph of an exemplary application scenario of using an identification and classification model which is stored in a memory of the information processing device according to the second embodiment.

FIG. 9 shows a schematic graph of an exemplary application scenario of using the identification and classification model stored in the memory of the information processing device according to the second embodiment.

As shown in FIG. 9, user comments 910 as an example of the inputted text are inputted to the identification and classification model 920, and the identification and classification model 920 performs processing to obtain an output result 930 as an example of a result of the identification and classification (for facilitating description, the final output result is represented by a table containing texts). Here, the user comments 910 are comments on an earphone in a commodity page of an online mall from the users. The identification and classification model 920 can identify a part related to one of N=13 indexes (for example sound quality, noise reduction, appearance, cost-to-performance ratio and a Bluetooth performance and so on) among the user comments, and performs classification on the identified parts with respect to the related indexes, that is, classifying the identified parts into one of M=3 types of sentiment (positive, negative or neutral). The result 930 of the identification and classification include the identified index and the sentiment type determined for the index.

As shown in FIG. 9, the identification and classification model 920 include a pre-trained word embedding extraction model 921 and a contextual representation model 922 that is not pre-trained. The word embedding extraction model 921 may be implemented based on the CEW model (that is, based on the attention mechanism). The contextual representation model 922 may be implemented by using multiple Bi-LSTM layers, multiple LSTM layers and a full connection layer (that is, based on the recurrent neural network). This structure is beneficial to improve the performance of the model.

Figures 10, 11:
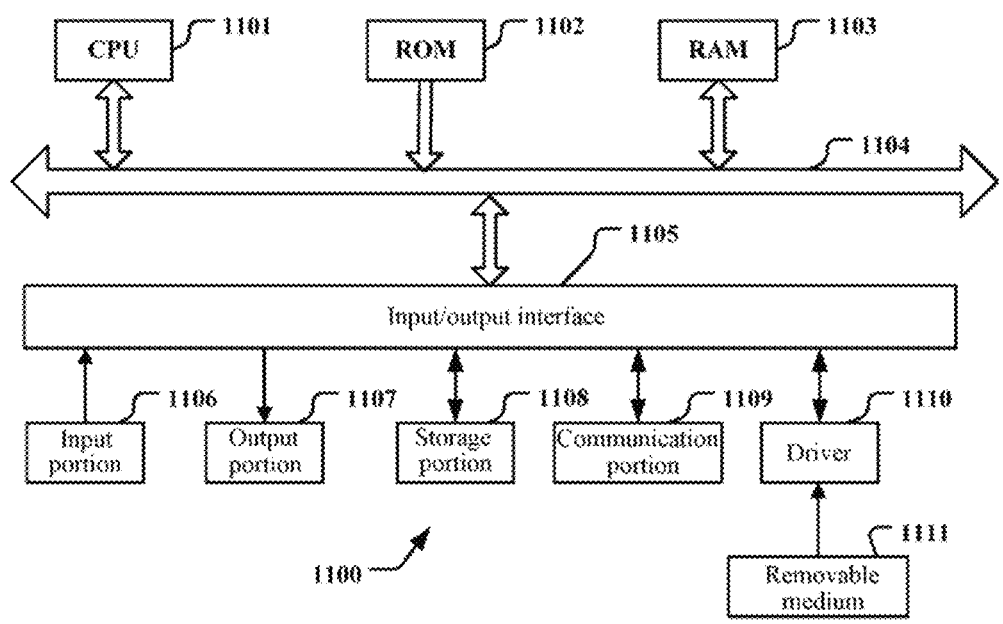
FIG. 10 shows performance comparison between identification and classification models of examples 1 and 2 of the present disclosure and an identification and classification algorithm of a comparison example 1.
FIG. 11 shows a block diagram of a schematic structure of a general purpose personal computer which can implement the method, device and/or system according to the embodiments of the present disclosure.

FIG. 10 shows performance comparison between identification and classification models according to examples 1 and 2 of the present disclosure and an identification and classification algorithm of a comparison example 1.

The identification and classification algorithm in the comparison example 1 is implemented by a machine learning algorithm based on rules. In the identification and classification model in the example 1 of the present disclosure, the pre-trained word embedding extraction model is implemented by using a word2vcec model, and the contextual representation model that is not pre-trained is implemented by using the Bi-LTSM model. The identification and classification model according to the example 2 of the present disclosure has the structure of the identification and classification model 920 shown in FIG. 9: the pre-trained word embedding extraction model is implemented by using the BERT model (that is, the CWE model based on the attention mechanism), and the contextual representation model not pre-trained is implemented by using multiple Bi-LSTM layers, multiple LSTM layers and a full connection layer. In other words, the word embedding extraction model and the contextual representation model in the example 2 respectively adopt the attention mechanism and the RNN model, so that a "complementary" structure is adopted in the entire model. Here, respective algorithm(s) and models have parameter sizes of a same level.

In each of the examples and the comparison example, an object of the model or algorithm is to identify a part related to one or more of N=13 indexes (for example sound quality, noise reduction, appearance, cost-to-performance ratio and Bluetooth performance and so on) among the user comments, and classify the identified part with respect to the related indexes into one of M=3 types of sentiment (positive, negative or neutral). In each of the examples and comparison example, the model or algorithm adopts three million pieces of labeled user comments as training data (the training data is a text sample set of the specific field that is generated, for example, by the information processing device in the first embodiment of the present disclosure, according to the manner described in [4.2 sample sets for training models in the information processing device]), and selects two thousands of pieces of real user comments labeled with at most 13 indexes and corresponding types for testing.

As shown in FIG. 10, in terms of the number of false negative (FN), the number of false positive (FP), the number of true positive (TP), false sentiment (FS), precision, and recall, the examples 1 and 2 are each superior when compared with the algorithm in the comparison example 1, and the model in the example 2, which has a structure of combining the attention mechanism and the recurrent neural network, obtains great improvement in all these aspects. For example, the precision and the recall in the example 1 are increased to 77.8% and 80.6% respectively from 71.6% and 70.7% in the comparison example 1, and the precision and the recall in the example 2 are further increased to 86.5% and 87.6% respectively.

It should be noted that, in the table shown in FIG. 10, false negative (FN) indicates a case that a part related to an index is not identified from the user comments, that is, a case of missing detection. An example of the FN case is as follows: the comment sample of "the sound quality is best among the earphones I experienced", which is related to the sound quality index and whose sentiment is "positive", is erroneously identified as noises irrelevant to the index of sound quality.

The false positive (FP) indicates a case that the user comment does not relate to the related index but is erroneously identified for the related index and a sentiment type is provided, that is, a case of erroneous detection. An example of the FP case is as follows: the noise comment sample of "just received, the sound quality is not tested", which is irrelevant to the sound quality, is erroneously identified as being related to the sound quality index and a sentiment type of "positive" is provided.

The true positive (TP) indicates a case that the indexes related to the user comments are correctly identified and sentiment classification is correctly provided, that is, a case of correct detection. An example of the TP case is as follows: the comment sample of "fine treble and exciting bass", which is related to the sound quality index and whose sentiment is "positive", is correctly identified as being related to the sound quality index and its sentiment is classified into "positive".

The false sentiment (FS) indicates a case that the index related to the user comments is correctly identified but an erroneous sentiment type is provided, that is, a case of erroneous sentiment classification. An example of the FS is as follows: the comment sample of "middle bass is OK, and the whole quality is acceptable", which is relevant to the sound quality index and whose sentiment is "neutral", is correctly identified as being related to the sound quality index but the sentiment is erroneously classified as "negative".

In addition, the Precision may be calculated according to the numbers of samples being true positive (TP) and false positive (FP) defined above, that is, Precision=TP/(TP+FP). In addition, the Recall may be calculated according to the numbers of samples being true positive (TP) and false negative (FN) defined above, that is, Recall=TP/(TP+FN).

Configuration examples of the information processing device according to the second embodiment of the present disclosure are described above. With the information processing device according to the second embodiment, particularly the identification and classification model stored in the information processing device, the word embedding extraction model that is pre-trained by using the text not exclusively belonging to the specific field is utilized in combination with the contextual representation model that is not pre-trained, so that good feature representation capability with respect to the word embedding is obtained from the word embedding extraction model and good contextual representation capability in the specific field is obtained from the contextual representation model, thereby improving the final identification and classification effect.

Basic principles of the present disclosure are described in combination with specific embodiments. It should be noted that, those skilled in the art should understand that all or any step or component of the method and device according to the present disclosure may be implemented by hardware, firmware, software or combination thereof in any computation device (including a processor and a storage medium and so on) or a network of computation devices, and those skilled in the art can implement the present disclosure after reading the description of the present disclosure and using his basic circuit design knowledge or basic programming skill.

In addition, a program product storing machine readable instruction codes is further provided according to the present disclosure. The instruction codes, when being read and executed by the machine, can perform the methods according to the embodiments of the present disclosure.

Accordingly, a storage medium for carrying the program product storing the machine readable instruction codes may be included in the present disclosure. The storage medium includes but not limited to software, optical disk, magnetic optical disk, storage card and memory stick.

5. Schematic Structure of a General Purpose Personal Computer for Implementing the Method and/or Device According to the Embodiments In a case of implementing the present disclosure by software or firmware, programs consisting of the software are installed to a computer with a dedicated hardware structure (for example a general purpose computer 1100 shown in FIG. 11) from a storage medium or network. The computer can perform various functions when being installed with various programs.

FIG. 11 shows a block diagram of a schematic structure of a general purpose personal computer which can implement the method, device and/or the system according to the embodiments of the present disclosure.

In FIG. 11, a central processing unit (CPU) 1101 performs various processing according to a program stored in a read-only memory (ROM) 1102 or a program loaded from a storage portion 1108 to a random-access memory (RAM) 1103. Data required when the CPU 1101 performs various processing is also stored in the RAM 1103 as needed. The CPU 1101, the ROM 1102, and the RAM 1103 are linked to each other via a bus 1104. An input/output interface 1105 is also linked to the bus 1104.

The following components are linked to the input/output interface 1105: an input portion 1106 (including a keyboard, a mouse or the like), an output portion 1107 (including a display such as a cathode ray tube (CRT), a liquid crystal display (LCD), a loudspeaker or the like), a storage portion 1108 (including a hard disk or the like), and a communication portion 1109 (including a network interface card such as a LAN card, a modem or the like). The communication portion 1109 performs communication processing via a network such as the Internet. A driver 1110 may also be linked to the input/output interface 1105 as needed. A removable medium 1111 such as a magnetic disk, an optical disk, a magneto-optical disk, a semiconductor memory may be installed on the driver 1110 as needed, so that a computer program read from the removable medium 1111 is installed into the storage portion 1108 as needed.

In a case where the above series of processing are implemented by software, a program constituting the software is installed from a network such as the Internet, or a storage medium such as the removable medium 1111.

Those skilled in the art should understand that the storage medium is not limited to the removable medium 1111 shown in FIG. 11 that stores a program and is distributed separately from the apparatus so as to provide the program to the user. The removable medium 1111, for example, may include: a magnetic disk (including a floppy disk (registered trademark)); an optical disk (including a compact disk read only memory (CD-ROM) and a digital versatile disc (DVD)); a magneto-optical disk (including a minidisc (MD) (registered trademark)); and a semiconductor memory. Alternatively, the storage medium may be the ROM 1102, a hard disk included in the storage portion 1108 or the like. The storage medium has a program stored therein and is distributed to the user together with an apparatus in which the storage medium is included.

Preferred embodiments of the present disclosure are described above with reference to the drawings, but the preset disclosure is not limited to the above embodiments. Those skilled in the art may make various changes and modifications within the scope of the attached claims, and it should be understood that these changes and modifications naturally fall within the technical scope of the present disclosure.

For example, units shown by dashed lines in the functional blocks shown in the drawings indicate the functional units are optional in corresponding devices, and the optional functional units may be combined in an appropriate manner to implement the required function.

For example, multiple functions of one unit in the above embodiments may be implemented by multiple separate devices. Alternatively, multiple functions implemented by multiple units in the above embodiments may be implemented by separate devices. In addition, one of the above functions may be implemented by multiple units. Needless to say, such configurations are included in the technical scope of the present disclosure.

In the specification, steps described in the flowchart may not only be performed in the described order and in the time order, but also may be performed in parallel or independently without being performed in the time order. In addition, in a case that steps are performed in the time order, needless to say, the order may be changed appropriately.

In addition, the present disclosure may include the following configurations.

(1). An information processing device, comprising:
processing circuitry configured to:
construct, for each of a plurality of indexes, a sample unit set for the index based on a plurality of minimum labeled sample units related to the index which are obtained and labeled from an original sample set; and
extract, for at least a part of the constructed plurality of sample unit sets, a minimum labeled sample unit from each sample unit set, and generate a labeled training sample based on the extracted minimum labeled sample unit.

(2). The information processing device according to (1), wherein for each of the plurality of indexes, the minimum labeled sample unit related to the index is labeled with one of a plurality of predetermined labels for a classification task with respect to the index.

(3). The information processing device according to (1), wherein the processing circuitry is further configured to: generate a labeled training sample by combining the extracted minimum labeled sample units randomly.

(4). The information processing device according to (1), wherein the processing circuitry is further configured to: randomly determine at least the part of the sample unit sets among the constructed plurality of sample unit sets.

(5). The information processing device according to (4), wherein the processing circuitry is further configured to: repeatedly perform the process of randomly determining at least the part of the sample unit sets, extracting the minimum labeled sample units and generating the labeled training sample, to obtain a training sample set including a plurality of the labeled training samples.

(6). The information processing device according to (5), wherein the processing circuitry is further configured to: determine an expected distribution at least based on an original distribution of the numbers of indexes related to a plurality of original samples in the original sample set, and control the processes performed repeatedly, so that the numbers of indexes related to the labeled training samples in the obtained training sample set follow the expected distribution.

(7). The information processing device according to (6), wherein the expected distribution is based on at least a normal distribution whose mean and variance are based on a mean and a variance of the numbers of indexes related to the plurality of original samples in the original sample set.

(8). The information processing device according to (7), wherein the processing circuitry is further configured to:
adjust the normal distribution with the original distribution to determine the expected distribution in which an occurrence probability of the numbers of indexes related to the labeled training samples is equal to a weighted average of a first occurrence probability determined according to the normal distribution and a second occurrence probability determined according to the original distribution.

(9). The information processing device according to (5), wherein the processing circuitry is configured to: include noise samples of a predetermined ratio in the training sample set.

(10). The information processing device according to any one of (1) to (9), wherein the original sample set includes a plurality of original text samples.

(11). The information processing device according to (10), wherein each of the plurality of indexes is related to specific content involved in the text sample, and each of the minimum labeled sample units includes a minimum set of consecutive sentences for describing the corresponding index.

(12). An information processing device, comprising:
a memory storing an identification and classification model for texts of a specific field, wherein the identification and classification model is to identify a part related to at least one index from inputted texts of the specific field, and perform classification on the identified part with respect to the related index;
wherein the identification and classification model comprises:
a word embedding extraction model obtained by pre-training by using at least a first text sample set not exclusively belonging to the specific field, and configured to extract word embedding from inputted texts; and
a contextual representation model obtained by training by using a second text sample set of the specific field, and configured to output a result of the classification according to the word embedding extracted by the word embedding extraction model.

(13). The information processing device according to (12), wherein one of the word embedding extraction model and the contextual representation model is based on a recurrent neural network, and the other of the word embedding extraction model and the contextual representation model is based on an attention mechanism.

(14). The information processing device according to (12), wherein at least one labeled training sample in the second text sample set is obtained by:

constructing, for each of a plurality of indexes, a sample unit set for the index based on a plurality of minimum labeled sample units related to the index which are obtained and labeled from an original text sample set of the specific field; and extracting, for at least a part of the constructed plurality of sample unit sets, a minimum labeled sample unit from each sample unit set, and generating a labeled training sample based on the extracted minimum labeled sample unit.

(15). The information processing device according to (14), wherein for each of the plurality of indexes, the minimum labeled sample unit related to the index is labeled with one of a plurality of predetermined labels for a classification task with respect to the index.

(16) The information processing device according to (14), wherein at least one labeled training sample is generated by combining the extracted minimum labeled sample units randomly.

(17). The information processing device according to (14), wherein at least the part of the sample unit sets are randomly determined among the constructed plurality of sample unit sets.

(18). The information processing device according to (17), wherein in the second text sample set, the numbers of indexes related to the labeled training samples follow an expected distribution determined based on at least an original distribution of the numbers of indexes related to a plurality of original samples in the original text sample set.

(19). The information processing device according to (18), wherein the expected distribution is based on at least a normal distribution whose mean and variance are based on a mean and a variance of the numbers of indexes related to the plurality of original samples in the original text sample set.

(20). The information processing device according to (19), wherein in the expected distribution, an occurrence probability of the numbers of indexes related to the labeled training samples is equal to a weighted average of a first occurrence probability determined according to the normal distribution and a second occurrence probability determined according to the original distribution.

(21). The information processing device according to (14), wherein the second text sample set includes noise samples of a predetermined ratio.

(22). The information processing device according to (14), wherein each of the plurality of indexes is related to specific content involved in the text of the specific field, and each of the minimum labeled sample units includes a minimum set of consecutive sentences for describing the corresponding index.

(23). An information processing method, comprising:
constructing, for each of a plurality of indexes, a sample unit set for the index based on a plurality of minimum labeled sample units related to the index which are obtained and labeled from an original sample set; and
extracting, for at least a part of the constructed plurality of sample unit sets, a minimum labeled sample unit from each sample unit set, and generating a labeled training sample based on the extracted minimum labeled sample unit.

(24). A non-transitory computer readable storage medium storing programs, wherein the programs, when being executed by a processor, cause the processor to perform the method according to (23).

Although specific embodiments of the present disclosure have been described above with reference to the drawings, it should be understood that all the embodiments described above are illustrative and not restrictive of the present disclosure. Various modifications, improvements and equivalents may be made to the present disclosure by those skilled in the art within the scope and spirit of the present disclosure. Therefore, the scope of the present disclosure is defined only by the accompanying claims and equivalents thereof.

The invention claimed is:

1. An information processing device, comprising:
processing circuitry configured to:
construct, for each of a plurality of indexes, a sample unit set for the index based on a plurality of minimum labeled sample units related to the index which are obtained and labeled from an original sample set, the original sample set including a plurality of original text samples, wherein each of the plurality of indexes is related to specific content involved in the original text sample;
extract, for at least a part of the constructed plurality of sample unit sets, a minimum labeled sample unit from each sample unit set,
wherein the processing circuitry for extracting the minimum labeled sample unit from each sample unit set is further configured to
extract a minimum set of consecutive sentences from the original text sample containing feature key words in the index library for describing the corresponding index, and
generate a labeled training sample in a form of the original sample set based on the extracted minimum labeled sample unit, wherein a labeling rule for indexes that are suitable for labeling the original sample set is used during preprocessing for the extracting and labeling of the minimum labeled sample unit,
wherein the processing circuitry for generating the labeled training sample is further configured to
combine the extracted minimum labeled sample units randomly, wherein the extracted minimum labeled sample unit relates to only the index of the given sample unit set and has only one label related to that index.

2. The information processing device according to claim 1, for each of the plurality of indexes, the minimum labeled sample unit related to the index is labeled with one of a plurality of predetermined labels for a classification task with respect to the index.

3. The information processing device according to claim 1, wherein the processing circuitry is further configured to:
randomly determine at least the part of the sample unit sets among the constructed plurality of sample unit sets.

4. The information processing device according to claim 3, wherein the processing circuitry is further configured to:
repeatedly perform the process of randomly determining at least the part of the sample unit sets, extracting the minimum labeled sample units and generating the labeled training sample, to obtain a training sample set including a plurality of the label training samples.

5. The information processing device according to claim 4, wherein the processing circuitry is further configured to:
determine an expected distribution at least based on an original distribution of the numbers of indexes related to a plurality of original samples in the original sample set, and control the processes performed repeatedly, so that the distribution of the numbers of indexes related to the labeled training samples in the obtained training sample set follows the expected distribution.

6. The information processing device according to claim 5, wherein the expected distribution is based on at least a normal distribution whose mean and variance are based on a mean and a variance of the numbers of indexes related to the plurality of original samples in the original sample set.

7. The information processing device according to claim 6, wherein the processing circuitry is further configured to:
    adjust the normal distribution with the original distribution to determine the expected distribution in which an occurrence probability of the numbers of indexes related to the labeled training samples is equal to a weighted average of a first occurrence probability determined according to the normal distribution and a second occurrence probability determined according to the original distribution.

8. The information processing device according to claim 4, wherein the processing circuitry is configured to: include noise samples of a predetermined ratio in the training sample set.

9. An information processing method, comprising:
    constructing, for each of a plurality of indexes, a sample unit set for the index based on a plurality of minimum labeled sample units related to the index which are obtained and labeled from an original sample set, the original sample set including a plurality of original text samples, wherein each of the plurality of indexes is related to specific content involved in the original text sample;
    extracting, for at least a part of the constructed plurality of sample unit sets, a minimum labeled sample unit from each sample unit set, and generating a labeled training sample based on the extracted minimum labeled sample unit,
    wherein extracting the minimum labeled sample unit from each sample unit set includes
        extracting a minimum set of consecutive sentences from the original text sample containing feature key words in the index library for describing the corresponding index; and
    generating a labeled training sample in a form of the original sample set based on the extracted minimum labeled sample unit, wherein a labeling rule for indexes that are suitable for labeling the original sample set is used during preprocessing for the extracting and labeling of the minimum labeled sample unit,
    wherein generating the labeled training sample includes
        combining the extracted minimum labeled sample units randomly, wherein the extracted minimum labeled sample unit relates to only the index of the given sample unit set and has only one label related to that index.

* * * * *